United States Patent
Matsuzaki

[11] Patent Number: 5,317,515
[45] Date of Patent: May 31, 1994

[54] VEHICLE HEADING CORRECTION APPARATUS

[75] Inventor: Shin-ichi Matsuzaki, Osaka, Japan

[73] Assignee: Sumitomo Electric Industries, Ltd., Osaka, Japan

[21] Appl. No.: 820,736

[22] Filed: Jan. 15, 1992

[30] Foreign Application Priority Data

Jan. 23, 1991 [JP] Japan .................................. 3-006600

[51] Int. Cl.$^5$ ............................................ G01C 21/20
[52] U.S. Cl. .................................... 364/454; 364/450; 342/457
[58] Field of Search ............... 364/449, 450, 457, 454; 342/357, 457

[56] References Cited

U.S. PATENT DOCUMENTS

| | | | |
|---|---|---|---|
| 4,032,758 | 6/1977 | Lewis | 235/150.2 |
| 4,713,767 | 12/1987 | Sato et al. | 364/453 |
| 4,924,402 | 5/1990 | Ando et al. | 364/449 |
| 5,087,919 | 2/1992 | Odagawa et al. | 342/357 |
| 5,155,688 | 10/1992 | Tanaka et al. | 364/454 |

FOREIGN PATENT DOCUMENTS

| | | |
|---|---|---|
| 0272078 | 6/1988 | European Pat. Off. . |
| 0360934 | 4/1990 | European Pat. Off. . |
| 0391647 | 10/1990 | European Pat. Off. . |
| 0393935 | 10/1990 | European Pat. Off. . |
| 0451988 | 10/1991 | European Pat. Off. . |
| 0496508 | 7/1992 | European Pat. Off. . |

Primary Examiner—Thomas G. Black
Assistant Examiner—Michael Zawelli
Attorney, Agent, or Firm—Lane, Aitken & McCann

[57] ABSTRACT

When the location of a vehicle is detected based on the outputs of distance and heading sensors, an absolute heading of the vehicle is corrected with a difference between a movement direction of the vehicle obtained during the time that two external location data are obtained by a GPS receiver and an estimated movement direction of the vehicle calculated based on the estimate vehicle location outputted from an estimated location detecting unit.

1 Claim, 2 Drawing Sheets

VEHICLE HEADING CORRECTION APPARATUS

FIELD OF THE INVENTION

The present invention relates to a vehicle heading correction apparatus that is employed in a vehicle location detecting apparatus for detecting the location of a vehicle traveling streets.

DESCRIPTION OF THE PRIOR ART

As a method for providing information about the actual location of a vehicle traveling streets, there is known "dead reckoning," in which a distance sensor, a heading sensor (magnetic sensor or gyro) and a processing unit for processing distance and heading data acquired from the distance and heading sensors are employed and the current location data of a vehicle is acquired by integrating an amount of distance change $\delta l$ and an amount of heading change $\delta \theta$. In the dead reckoning method, the east-west directional component $\delta x$ ($=\delta l \times \cos \theta$) and south-north directional component $\delta y$ ($=\delta l \times \sin \theta$) of the distance change amount $\delta l$ that occurs as the vehicle moves along a street are calculated, and a current location output data (Px, Py) is acquired by adding the calculated components $\delta x$ and $\delta y$ to the previous location output data (Px', Py').

In the method described above, the previous location data is needed in order to calculate the current location data, and the further previous location data is needed in order to calculate the previous location data. As a consequence, the location data and heading data of the vehicle at the time of departure are needed. Therefore, if the location data and heading data of the vehicle at the time of departure contain errors, the errors will remain. For this reason, the location data and heading data of the vehicle at the time of departure must be accurate.

Incidentally, as a method for acquiring the heading data at the time of departure, there are a method using a magnetic sensor for sensing an absolute heading or method in which the heading of a vehicle is inputted by a vehicle operator on the basis of road map, surrounding geographical features, etc. However, the heading sensed with the magnetic sensor normally contains the following error. That is, the magnetic sensor is one which senses the intensity of the feeble Earth's magnetic field, and if a moving body is magnetized, errors will arise in the output data of the magnetic sensor. In order to compensate the errors, the initialization of the magnetic sensor can be made. However, when the moving body passes through regions including magnetic disturbance, such as railroad crossings, places wherein power cables are buried, iron bridges, highways with sound insulating walls and high buildings, the moving body is subjected to the influence of the strong electromagnetic field and therefore the amount of the magnetization of the moving body varies. For this reason, errors arise again in the magnetic sensor output data during traveling.

Also, even if the direction of a road specified with road map is inputted as the initial heading of a vehicle, errors will arise when the vehicle is not parallel to that road.

On the other hand, sometimes a vehicle has a GPS (Global Positioning System) mounted therein. The GPS is a technique which measures the location of the vehicle by the use of waves from GPS satellites, and the principles are to measure the two dimensional or three dimensional positions of the vehicle by measuring the propagation delay time of the waves generated by a plurality of artificial satellites circling in a predetermined orbit. In order to obtain the heading of a vehicle by the use of the GPS receiver, it is necessary to measure Doppler shift that occurs by receiving the waves from the GPS satellites during travel. To measure the Doppler shift, it is necessary that the vehicle is traveling at relatively high speeds. Therefore, since the heading of the vehicle cannot be measured unless it is traveling on freeways, the GPS could not be used at all times in the correction of the vehicle heading.

It is, accordingly, an important object of the present invention to provide a vehicle heading correction apparatus which is capable of obtaining the accurate heading, location and travel track of a vehicle by correcting the heading used in the detection of vehicle location.

SUMMARY OF THE INVENTION

In accordance with one important aspect of the present invention, there is provided a vehicle heading correction apparatus which comprises:

a distance sensor (1a, 1b), a heading sensor (2, 3), estimated location detecting means (6) for detecting an estimated vehicle location on the basis of outputs of the distance and heading sensors, location data acquisition means (4) for acquiring vehicle location data that are supplied from the outside, first arithmetic means for calculating a movement direction ($\alpha$) of the vehicle during the time that two of the vehicle location data are acquired by the location data acquisition means (4), on the basis of the two vehicle location data, second arithmetic means for calculating an estimated movement direction ($\beta$) of the vehicle during the time that the two vehicle location data are acquired, on the basis of the estimated vehicle location outputted from the estimated location detecting means (6), and correction means (7) for correcting an absolute heading of the vehicle with the aid of a difference ($\alpha - \beta$) between the movement direction ($\alpha$) calculated by the first arithmetic means and the estimated movement direction ($\beta$) calculated by the second arithmetic means.

The location data acquisition means may comprise a global positioning system receiver (4).

In the vehicle heading correction apparatus of the present invention, by the use of the first arithmetic means, the movement direction of the vehicle can be calculated from the two vehicle location data acquired from the outside. Then, with the second arithmetic means, the estimated movement direction of the vehicle during the time that the two vehicle location data are acquired is calculated. By considering a difference between the two movement directions to be a sort of error, the absolute heading of the vehicle can be corrected.

The correction method is shown in FIG. 1. The vehicle location that, when the first vehicle location data was acquired by the location data acquisition means, had been obtained by the estimated location detecting means is referred to as an "estimated vehicle location" and is indicated by reference character O. The vehicle location that, when the second vehicle location data was acquired, had been obtained by the estimated location detecting means is indicated by reference character P, and the travel track between O and P is by reference character L.

The vehicle location, which is calculated from the location data obtained as the first location data was acquired by the location data acquisition means, is referred to as an "acquired vehicle location", and is indicated by reference character O1. The acquired vehicle location, which is calculated from the location data obtained as the second location data was acquired, is indicated by reference character P1.

The acquired vehicle location O1 and the estimated vehicle location O are sometimes different from each other or the same. They are the same when the acquired vehicle location O1 is used as an initial location of the vehicle, at the time that the acquired vehicle location O1 was acquired by the estimated location detecting means. However, since the objection of the present invention is to correct the heading of a vehicle, it is not always necessary that the locations O1 and O be the same. But, O and O1 are overlapped in FIG. 1 because explanation is easier.

It is now assumed that the coordinate of the estimated vehicle location P is (x, y) and the coordinate of the acquired vehicle location P1 is (x1, y1). It is also assumed that when detecting the estimated vehicle location P, the estimated location detecting means uses an initial heading $\theta_o$ at the origin O of the coordinate axes.

On the other hand, based on the coordinate (x1, y1) of the acquired vehicle location P1, the direction $\alpha$ of a vector OP1 at the origin O can be known by the following equation (a):

$$\alpha = \tan^{-1}(y1/x1) \qquad (a)$$

The direction $\alpha$ obtained by equation (a) can be considered to be an accurate one, because it can be assumed that the error in the acquired vehicle location P1 is smaller than that in the estimated vehicle location P obtained by dead reckoning.

In addition, based on the coordinate (x, y) of the estimated vehicle location P, the direction $\beta$ of a vector OP at the origin O can be known by the following equation (b):

$$\beta = \tan^{-1}(y/x) \qquad (b)$$

Therefore, if it is assumed that a difference between the direction $\beta$ and the direction $\alpha$ is $\alpha - \beta = \delta\theta$, the absolute heading $\theta$ of the vehicle can be corrected using $\delta\theta$. That is, if "x" represents a vector product and "·" represents a scalar product, $$\begin{aligned}\tan\delta\theta &= \tan(\alpha - \beta) \\ &= \sin(\alpha - \beta)/\cos(\alpha - \beta) \\ &= OP \times OP1/OP \cdot OP1 \\ &= (x\,y1 - x1\,y)/(x\,x1 + y\,y1)\end{aligned}$$

Therefore, $\delta\theta$ can be calculated as follows:

$$\delta\theta = \tan^{-1}(x\,y1 - x1\,y)/(x\,x1 + y\,y1) \qquad (c)$$

Then, $$\theta + \delta\theta = \theta' \qquad (d)$$

By equation (d), the heading $\theta'$ can be obtained as a new absolute heading of the vehicle.

When an initial heading $\theta_o$ is corrected, a corrected heading can be obtained by the following equation:

$$\theta_o + \delta\theta = \theta_o' \qquad (d)$$

Based on the corrected heading $\theta_o'$, the track traveled from the origin O can be calculated again. In this way, a more accurate travel track L' can be obtained.

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENTS

Figure 2:
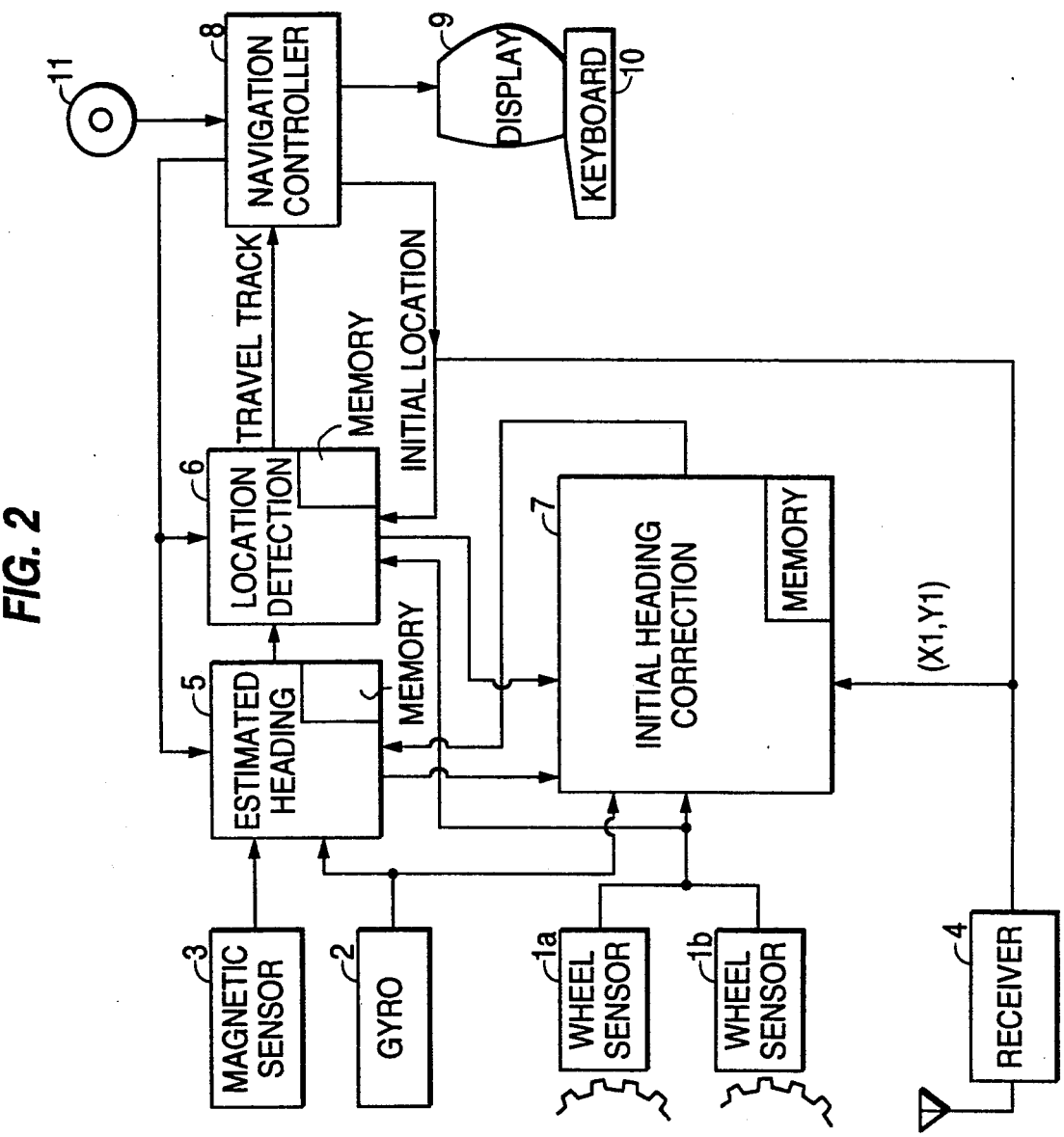
FIG. 2 is a block diagram illustrating a vehicle location detecting apparatus for carrying out the vehicle heading correction method.

FIG. 2 illustrates a vehicle location detecting apparatus for carrying out a vehicle heading correction method according to the present invention. The vehicle location detecting apparatus comprises wheel sensors 1a and 1b which sense the number of rotations of the left and right wheels of a vehicle, a gyro 2 for sensing a turning angular velocity, a magnetic sensor 3 for sensing an absolute heading of a vehicle on the basis of terrestrial magnetism, and a GPS (Global Positioning System) receiver 4. The gyro 2 is selected from among an optical fiber gyro which reads a turning angular velocity as a phase change of interference light, a vibration gyro which senses a turning angular velocity with the aid of a cantilever vibration technique of a piezoelectric element, and a mechanical type gyro. An initial heading correcting unit 7 is connected with the wheel sensors 1a and 1b. A heading estimating unit 5 is connected with the gyro 2, magnetic sensor 3 and the initial heading correcting unit 7, and estimates the current heading of a vehicle on the basis of an initial heading inputted from the magnetic sensor 3 or initial heading correcting unit 7 and of data on a heading change amount sensed by the gyro 2. A location detecting unit 6 calculates data on the distance traveled from an initial location (which is set by a keyboard 10 or inputted from the GPS receiver 4) on the basis of the number of rotations of the wheels sensed by the wheel sensors 1a and 1b. Also, the location detecting unit 6 reads the heading data outputted from the heading estimating unit 5 and then calculates a travel track having the initial location as the starting point by dead reckoning. The travel track calculated by the location detecting unit 6 is inputted to a navigation controller 8. A display 9 is provided to display the vehicle location, heading and the travel track, together with road map stored in a road map memory 11.

The road map memory 11 uses storage medium, such as a semiconductor memory, cassette tape, CD-ROM, IC memory and DAT, and stores data on road network of a predetermined area, intersections, railroad network and the like, in the form of the combination of a node and a link.

The above described navigation controller 8 is constituted by a figure processor, an image processing memory or the like, and performs retrieval of map that is displayed on the display 9, input of an initial location, switching of scale, scrolling, etc.

Figure 1:
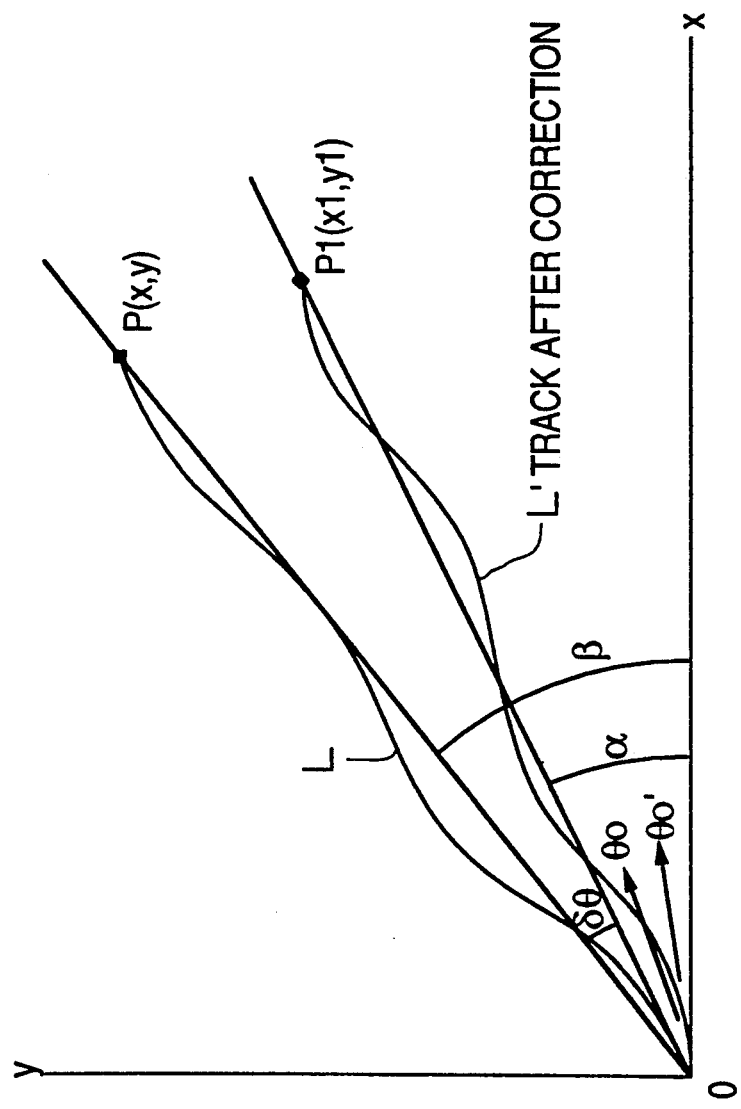
FIG. 1 is a diagram of a vehicle travel track used to explain a vehicle heading correction method according to the present invention.

Based on two location data received from the GPS receiver 4, the initial heading correcting unit 7 calculates the movement direction α (FIG. 1) of the vehicle during the two receptions. Also, based on the vehicle location data outputted from the location detecting unit 6, the initial heading correcting unit 7 calculates the movement direction β (FIG. 1) of the vehicle during the above described two receptions. Then, based on a difference δθ between the movement directions α and β, the absolute heading of the vehicle is corrected.

The operation of the vehicle location detecting apparatus will hereinafter be described in detail.

Before traveling, a vehicle driver selects road map of a predetermined area containing the current location of the vehicle from the road map memory 11 by the manipulation of the keyboard 10. The selected road map is displayed on the display 9. Next, the initial location of the vehicle is set by the manipulation of the keyboard 10. This setting is made by moving a cursor indicating the vehicle location on the road map. At this point, the initial heading of the vehicle is set by reading the output of the magnetic sensor 3. In this way, the data representative of the initial location and initial heading of the vehicle are supplied to the heading estimating unit 5 and the location detecting unit 6.

After the initialization described above, the vehicle is moved, and in the location detecting unit 6, data on the distance traveled from the initial location is calculated based on the wheel rotational speed signals from the wheel sensors 1a and 1b. Also, in the heading estimating unit 5, the current heading of the vehicle is integrated based on the data on the angular velocity from the gyro 2. Then, data on travel track is calculated in the location detecting unit 6 on the basis of the travel distance data and the current heading data, and is supplied to the navigation controller 8. The navigation controller 8 displays the vehicle location, heading and the travel track on the picture screen of the display 9, together with the road map.

If data on a vehicle location from the GPS receiver 4 are inputted, the initial heading correcting unit 7 calculates a corrected initial heading on the basis of any two of the inputted vehicle location data, and the corrected initial heading is supplied to the heading estimating unit 5.

The correction of an initial heading in the initial heading correcting unit 7 is made as follows.

If the first vehicle location data (Xo, Yo) is inputted from the GPS receiver 4 during travel, the initial heading correcting unit 7 acquires a heading θo at that time from the heading estimating unit 5 and stores the heading θo in the memory thereof, together with the vehicle location data (Xo, Yo). The vehicle location data (Xo, Yo) at that time is also inputted to the location detecting unit 6 as a data on an initial location, so the location detecting unit 6 resets the current location to (Xo, Yo) and calculates a vehicle location with this current location (Xo, Yo) as the starting point.

Next, if the second vehicle location data (X1, Y1) is inputted from the GPS receiver 4, the initial heading correcting unit 7 acquires the current heading data θ at that time from the heading estimating unit 5 and also the estimated vehicle location data (X, Y) at that time from the location detecting unit 6. Based on these data, the estimated movement amount of the vehicle during these two receptions is calculated as follows:

$$(x, y) = (X, Y) - (Xo, Yo)$$

Also, based on the GPS reception data, the movement amount of the vehicle during the two receptions described above is calculated as follows:

$$(x1, y1) = (X1, Y1) - (Xo, Yo)$$

Then, a heading estimated error δθ is acquired by the above described equation (c) and added to the initial heading θo to correct the initial heading.

The initial heading θo' thus corrected is supplied to the heading estimating unit 5, which calculates the heading data of the vehicle again on the basis of this initial heading θo', and the location detecting unit 6 also calculates the travel track data again on the basis of the heading data calculated again. In these calculations, the heading data and travel distance data that have been stored in a predetermined memory are used. The travel track data thus calculated again by the location detecting unit 6 is inputted to the navigation controller 8 and displayed on the display 9. Therefore, the track being displayed on the display 9 is corrected to an accurate track, each time the GPS data is received.

While it has been described that the GPS receiver 4 is used as location data acquiring means for acquiring location data that is supplied from the outside, it is noted that a beacon receiver may also be used instead of the GPS receiver. In addition, information on the location of a vehicle may also be inputted by the driver on the basis of road map.

What I claim is:

1. A vehicle heading correction apparatus comprising:
   a distance sensor;
   a heading sensor;
   estimated location detecting means for detecting an estimated vehicle location on the basis of outputs of said distance and heading sensors;
   location data acquisition means comprising a global positioning system receiver for acquiring plural vehicle location data that are supplied from outside of the vehicle;
   first arithmetic means for calculating a movement direction of said vehicle during the time that two of said vehicle location data are acquired by said location data acquisition means, on the basis of said two vehicle location data;
   second arithmetic means for calculating an estimated movement direction of said vehicle during the time that said two vehicle location data are acquired, on the basis of said estimated vehicle location outputted from said estimated location detecting means; and
   correction means for correcting an absolute heading of said vehicle with the aid of a difference between said movement direction calculated by said first arithmetic means and said estimated movement direction calculated by said second arithmetic means.

* * * * *